Aug. 3, 1937. M. N. MATVEYEFF 2,088,916
SEALING CLIP FOR CARDBOARD BOXES
Filed Nov. 17, 1936 2 Sheets-Sheet 1
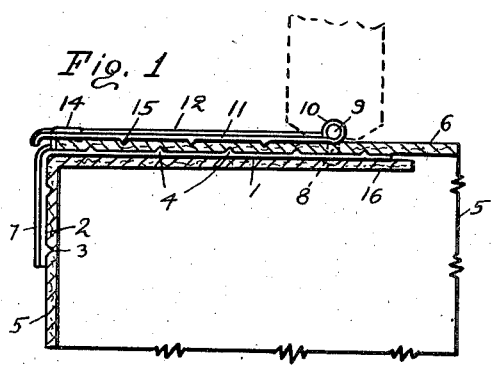
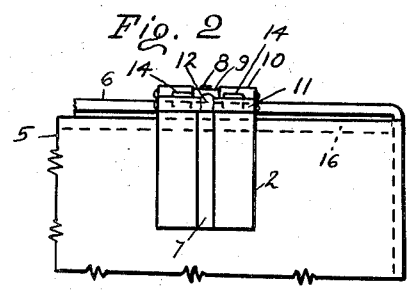
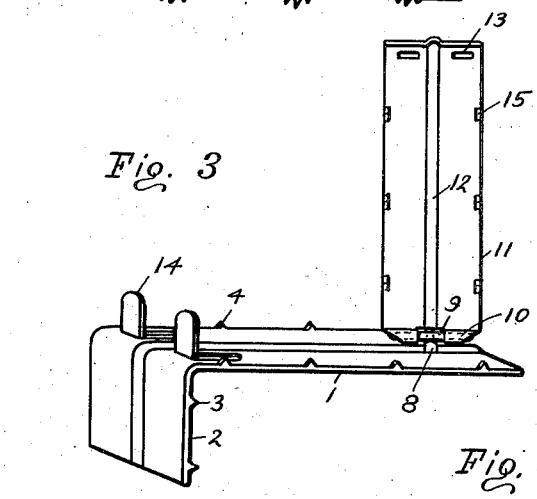
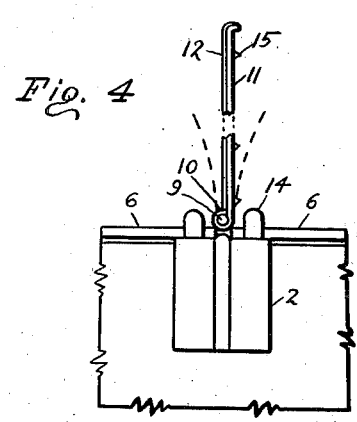
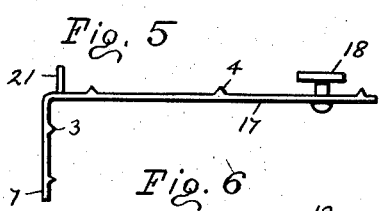
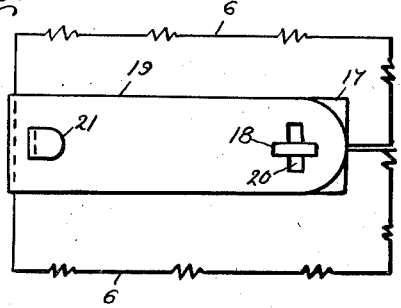
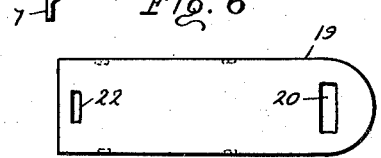
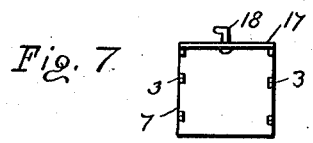
MICHAEL N. MATVEYEFF
INVENTOR
BY John P. Nikonow
ATTORNEY Aug. 3, 1937.   M. N. MATVEYEFF   2,088,916
SEALING CLIP FOR CARDBOARD BOXES
Filed Nov. 17, 1936   2 Sheets-Sheet 2
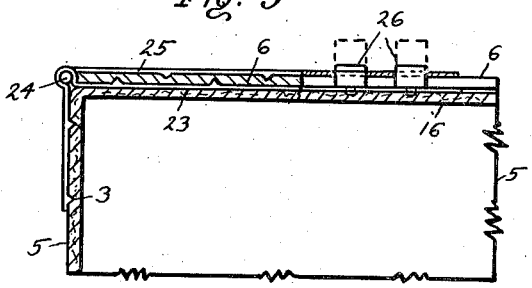
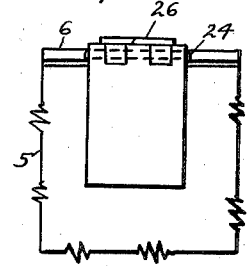
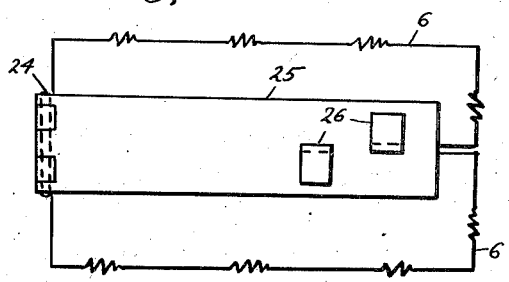
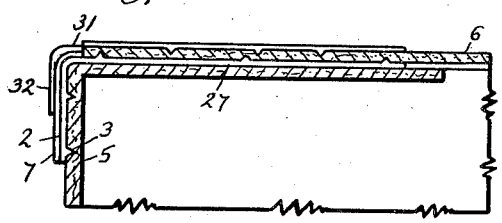
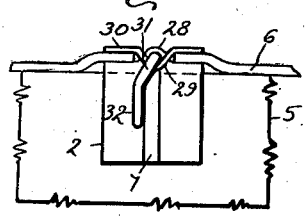
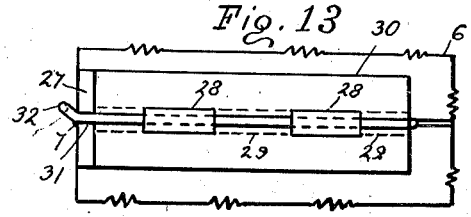
MICHAEL N. MATVEYEFF
INVENTOR
BY John P. Nironow
ATTORNEY Patented Aug. 3, 1937

2,088,916

UNITED STATES PATENT OFFICE 2,088,916

SEALING CLIP FOR CARDBOARD BOXES

Michael N. Matveyeff, Stratford, Conn.

Application November 17, 1936, Serial No. 111,203

10 Claims. (Cl. 292—288)

My invention relates to clips for sealing cardboard boxes and has particular reference to clamping clips made of sheet metal.

Cardboard boxes are largely used for packing various merchandise for shipment because of their cheapness, light weight and sufficient strength to withstand ordinary handling. Nails, screws and similar metal fasteners cannot be used with such boxes, and they are therefore sealed by pasting paper strips over the sealing joints. Such pasted seals are not quite satisfactory, however, as they can be easily torn, require a rather large amount of labor for their application, and they do not stand long shipments in damp climates.

The object of my invention is, therefore, to provide a metal clip for sealing cardboard boxes, the clip being cheaply made by stamping of sheet metal, and can be easily and quickly applied to the joints of cardboard boxes.

Another object of my invention is to provide a sealing clip which can be placed under the joint of two cover portions of a box where they meet each other, engaging at the same time the corner portion of the box by sharp projections so as to prevent sliding of the clip in any direction, the clip having a latch which can be securely fixed to the clip with the cover portions clamped between the clip plate and the latch.

Another object of my invention is to provide a sealing clip with a latch for clamping the cover portions together and against the box at the corner portion, the clip having projections which can be bent over the latch by the operator thereby clamping the cover portions in the clip and against the box.

My invention is more fully described in the accompanying specification and drawings in which—

Fig. 1 is a view showing my clip in the clamping position in a box, the latter being shown in section.

Fig. 2 is an end view of a box with my clip in the clamping position.

Fig. 3 is a perspective view of the clip before it is placed in the clamping position.

Fig. 4 is a view of the clip in position on a box ready to be clamped.

Fig. 5 is a view of a modified clip.

Fig. 6 is a view of a latch for the clip shown in Fig. 5.

Fig. 7 is an end view of the clip shown in Fig. 5.

Fig. 8 is a top plan view of the clip assembled on a box.

Fig. 9 is a view of a modified clip in a clamping position in a box.

Fig. 10 is a top plan view of the same.

Fig. 11 is an end view of the same.

Fig. 12 is a view of another modification in a clamping position on a box.

Fig. 13 is a top plan view of the same.

Fig. 14 is an end view of the same.

My sealing clip consists of a plate 1 bent at right angles so as to form a flange 2. The plate and the flange are provided with sharp points 3 and 4, the points 3 engaging the side 5 of a cardboard box from the outside, and the points 4 engaging cover plates 6 from underneath. The plate is placed over the corner of the box and the cover plates are turned over it as shown with dotted lines in Fig. 4. A longitudinal groove 7 is formed in the plate for stiffening it against bending strain.

A post 8 is pivotally fitted in the inner end portion of the plate 1 so that it can turn on its axis. Its upper end is fitted in a cross pin 9 held by its ends in bearings 10 formed in the end of a latch plate 11. The latter is also provided with a stiffening rib 12 and has slots 13 in the other end for lugs 14 formed at the front end of the plate 1, preferably by punching them out of the body of the plate as shown in Fig. 3. For assembling the clip on the box, the latch 11 is turned sidewise as shown in Fig. 4, permitting the cover portions 6 to be placed over the plate 1. The latch is then turned at right angles over the cover plates. To facilitate its turning, the latch has corners of the pin bearings beveled off as shown in Fig. 3. The latch has sharp points 15 which penetrate into the cardboards 6 when the latch is pressed against them. The lugs 14 pass through the slots 13 and are then bent over thereby holding the latch in the clamping position. The covers 6 are held together between the plate 1 with its points and the latch with its points 15, and the latch retains the covers tightly against the upper edge of the cardboard and against side plates 16 by the flange 2 whose points 3 prevent its slipping sidewise.

In a modified construction shown in Figs. 5, 6, 7 and 8, the plate 17 has a rigidly mounted T-shaped post 18, having its upper bar extending lengthwise with respect to the plate 1, so that it does not interfere with the closing of the cover plates 6. The latch 19 has a slot 20 for the post 18, but at right angles to the axis of the latch. The latch is placed in its position by turning it at right angles to the plate 1 and passing the slotted end over the post 18, then turning the latch in alignment with the plate. A lug 21 fits in a slot 22 and is bent over when the latch is in the clamping position.

Another modification is shown in Figs. 9, 10 and 11. Here a plate 23 forms a hinge at the corner where it is bent at right angles. A pin 24 is placed in the hinge for pivotally supporting the front end of a latch 25. Lugs 26 are provided in the rear portion of the plate 23, and the latch has slots for these lugs. The latch is pressed against the plate 23 when sealing the box, the lugs fitting in the slots in the latch, and then the lugs are bent out in different directions as shown in Fig. 10.

Still another modification is shown in Figs. 12, 13 and 14. Here a plate 27 has hinge lugs 28 along its axis, corresponding to hinge lugs 29 provided in the latch 30. For assembling the clip, the plate 27 is placed over the corner of the box, cover plates 6 folded over it, and the latch fitted in its place, being locked in the clamping position by a pin 31 with a handle 32. This type of clamp permits its easy assembly and taking apart.

It is understood that my sealing clip can be further modified without departing from the spirit of my invention as set forth in the appended claims.

I claim as my invention:

1. A sealing clip for cardboard boxes, comprising an elongated plate having one end portion bent at right angles, the plate being adapted to be placed over the corner of a cardboard box where its cover portions meet each other, a post rotatively fastened to the other end portion of the plate, a latch hingedly supported on the post by one end, the latch when turned sidewise permitting the cover portions to be placed over the plate, and being adapted to press the cover portions against the plate, and means on the plate to retain the latch in the clamping position.

2. A sealing clip for cardboard boxes, comprising an elongated plate having one end portion bent at right angles, the plate being adapted to be placed over the corner of a cardboard box where its cover portions meet each other, a post rotatively fastened on the other end portion of the plate and adapted to pass between the edges of the cover portions when the same are placed over the plate, a latch hingedly supported on the end of the post at a distance corresponding to the thickness of the cover portions, the latch being adapted to permit the cover portions to be placed over the plate when the latch is turned edgewise against the plate, the latch being adapted, upon being turned flatwise, to clamp the cover portions against the plate, and lugs on the plate adapted to be bent over the latch end portion for retaining the same in the clamping position.

3. A sealing clip for cardboard boxes, comprising an elongated plate having one end portion bent at right angles, the plate being adapted to be placed over the corner of a cardboard box where its cover portions meet each other, a post supported on the other end portion of the plate, a latch hingedly connected with the post and adapted to clamp the cover portions against the plate, means on the corner portion of the plate to retain the latch in the clamping position, and sharp projections on the plate adapted to engage the sides of the box.

4. A sealing clip for cardboard boxes, comprising an elongated plate having one end portion bent at right angles, the plate being adapted to be placed over the corner of a cardboard box where its cover portions meet each other, a post rotatively supported at the other end of the plate, a rod attached to the end of the post at right angles thereto at a distance from the plate corresponding to the thickness of the cover portions of the box, a latch rotatively fastened at one end to the rod, the latch being adapted, when turned sidewise with the post, to permit the cover portions to be closed against the plate, the latch being adapted, when turned flatwise against the plate, to clamp the cover portions against the plate, and means on the plate to retain the latch in the clamping position.

5. A sealing clip for cardboard boxes, comprising a plate bent at right angles at one end, a post fitted on the other end of the plate and provided with an enlarged portion on top, a latch hingedly connected with the enlarged portion, the plate being adapted to be placed over the corner of a cardboard box, cover portions of the box being adapted to be closed over the plate, the latch being adapted to clamp the cover portions against the plate and being provided with slots at its free end, and lugs on the plate adapted to engage the slots thereby retaining the latch in the clamped position.

6. A sealing clip for cardboard boxes, comprising a plate bent at right angles at one end and adapted to be placed over the corner of a cardboard box under the joint of its cover portions, a latch adapted to be placed over the joint, and means on the plate for holding the latch thereby clamping the cover portions together and against the box.

7. A sealing clip for cardboard boxes, comprising a plate bent at right angles and adapted to be placed over the corner of a cardboard box under the joint of its cover portions, a latch hingedly connected with the plate at one end and adapted to be placed against the plate over the joint of the box cover portions, and means on the plate for holding the other end of the latch in its clamping position.

8. A sealing clip for cardboard boxes, comprising a plate adapted to be placed under the joint of the cover portion of a cardboard box and adapted to engage its corner portion, a latch adapted to be placed over the joint of the cover portions against the plate, and means on the plate for holding both ends of the latch in its clamping position.

9. A sealing clip for cardboard boxes, comprising a plate adapted to be placed under the joint of the cover portions of a cardboard box and adapted to engage its corner portion, a latch, a rotatable hinge connecting the inner end of the plate with one end of the latch and permitting the cover portions to be closed over the hinge and the latch, the latch being adapted to be placed over the joint of the cover portions, and means on the plate for holding the other end of the latch in its clamping position.

10. A sealing clip for cardboard boxes, comprising a plate bent at right angles and adapted to be placed under the joint of the cover portions of the box at its corner, projecting members adapted to extend through the joint to the outside, and a latch adapted to be placed over the joint and having slots for the projecting members, the projecting members being adapted to be bent thereby securing the latch in its clamping position.

MICHAEL N. MATVEYEFF.